(12) United States Patent
Lomprey et al.

(10) Patent No.: US 6,188,505 B1
(45) Date of Patent: Feb. 13, 2001

(54) COLOR-STABILIZED ELECTROCHROMIC DEVICES

(75) Inventors: Jeffrey R. Lomprey; Thomas F. Guarr, both of Holland, MI (US)

(73) Assignee: Gentex Corporation, Zeeland, MI (US)

( * ) Notice: Under 35 U.S.C. 154(b), the term of this patent shall be extended for 0 days.

(21) Appl. No.: 09/377,455

(22) Filed: Aug. 19, 1999

(51) Int. Cl.$^7$ .................................................. G02F 1/15
(52) U.S. Cl. ........................ 359/265; 359/267; 359/270; 345/105
(58) Field of Search ................................ 359/265, 267, 359/270, 273, 275; 345/105

(56) References Cited

U.S. PATENT DOCUMENTS 5,724,187  3/1998  Varaprasad et al. ................. 359/608
5,910,854  6/1999  Varaprasad et al. ................. 359/273
5,998,617 * 12/1999  Srinivasa et al. ..................... 544/347

FOREIGN PATENT DOCUMENTS 830456  2/1993  (SU) .

* cited by examiner

*Primary Examiner*—Georgia Epps
*Assistant Examiner*—Tim Thompson
(74) *Attorney, Agent, or Firm*—Brian J. Rees; Factor & Partners, LLC

(57) ABSTRACT

An electrochromic medium for use in a normally operating electrochromic device comprising an anodic material and a cathodic material wherein both of the anodic and cathodic materials are electroactive and at least one of the anodic and cathodic materials is electrochromic, an additive, and means associated with the additive for maintaining a colorless or nearly colorless electrochromic medium while the electrochromic medium is in a high transmission state relative to an electrochromic medium without the additive.

57 Claims, 9 Drawing Sheets

COLOR-STABILIZED ELECTROCHROMIC DEVICES

BACKGROUND OF THE INVENTION

1. Field of the Invention

The present invention relates in general to electrochromic devices, and more particularly, to normally operating, color-stabilized electrochromic devices having an electrochromic medium comprising one or more additives, which serve to substantially preclude the formation of undesirable residual color within the electrochromic medium while in its high transmission state.

2. Background Art

Electrochromic devices have been known in the art for several years. While the utilization of electrochromic devices, such as electrochromic mirrors, has become increasing popular among, for example, the automotive industry, the development of undesirable residual color within the electrochromic medium remains problematic.

Indeed, when a sufficient electrical potential difference is applied across the electrodes of a conventional device, the electrochromic medium becomes intentionally colored (i.e. a low transmission state) inasmuch as one or more of the anodic and the cathodic materials are oxidized and reduced, respectively. Specifically, the anodic materials are oxidized by donating electrons to the anode, and the cathodic materials are reduced by accepting electrons from the cathode.

For most commercially available devices, when the electrical potential difference is removed or substantially diminished, the anodic and cathodic materials return to their native or unactivated state, and in turn, return the electrochromic medium to its colorless or nearly colorless state (i.e. a high transmission state). The application and removal of an electrical potential difference is conventionally known as a single cycle of the electrochromic device.

Scientists have observed that over a period of cycles and/or time, during normal operation of the electrochromic device, the electrochromic medium sometimes does not remain colorless in the high transmission state. In some instances, even in the absence of an electrical potential difference, either one or both of a portion of the anodic and cathodic materials are oxidized or reduced respectively, thereby forming residual oxidized and/or reduced materials. The residual oxidized anodic materials and/or the residual reduced cathodic materials of the electrochromic medium can result in an undesired residual coloration of the electrochromic medium.

Factors that are believed to facilitate the formation of the undesired residual oxidized anodic and/or reduced cathodic materials include, among other things, impurities within the medium, thermal and/or photochemical decomposition of one or more of the medium materials, and/or the permeation of water and/or oxygen into the electrochromic medium.

It is therefore an object of the present invention to provide an electrochromic medium with a color-stabilizing additive that remedies the aforementioned detriments and/or complications associated with maintaining a colorless or nearly colorless electrochromic device while the device is in its high transmission state.

SUMMARY OF THE INVENTION

The present invention is directed to an electrochromic medium for use in a normally operating electrochromic device comprising: (a) an anodic material and a cathodic material, wherein both of the anodic and cathodic materials are electroactive and at least one of the anodic and cathodic materials is electrochromic; and (b) an additive, wherein the additive is more easily reduced than the cathodic material.

In a preferred embodiment of the invention, the additive substantially precludes the formation of a residual reduced cathodic material while the electrochromic medium is in a high transmission state.

In another preferred embodiment of the invention, the additive comprises either an oxidized form of the anodic material or an additional material present in an oxidized form.

The present invention is also directed to an electrochromic medium for use in a normally operating electrochromic device comprising: (a) an anodic material and a cathodic material, wherein both of the anodic and cathodic materials are electroactive and at least one of the anodic and cathodic materials is electrochromic; and (b) an additive, wherein the additive comprises a reduced form of the cathodic material.

The present invention is further directed to an electrochromic medium for use in a normally operating electrochromic device comprising: (a) an anodic material and a cathodic material, wherein both of the anodic and cathodic materials are electroactive and at least one of the anodic and cathodic materials is electrochromic; and (b) an additive, wherein the additive is more easily oxidized than the anodic material, and wherein the additive is selected from the group comprising substituted ferrocenes, substituted ferrocenyl salts, and mixtures thereof.

The present invention is also directed to an electrochromic medium for use in a normally operating electrochromic device comprising: (a) an anodic material and a cathodic material, wherein both of the anodic and cathodic materials are electroactive and at least one of the anodic and cathodic materials is electrochromic; and (b) an additive, wherein the additive comprises (1) a first component that is more easily reduced than the cathodic material and (2) a second component that is more easily oxidized than the anodic material.

In a preferred embodiment of the invention, the first component substantially precludes the formation of a residual reduced cathodic material and the second component substantially precludes the formation of a residual oxidized anodic material while the electrochromic medium is in a high transmission state.

In another preferred embodiment of the invention, the first component comprises either an oxidized form of the anodic material or an additional electroactive material present in an oxidized form.

The present invention is additionally directed to an electrochromic medium for use in a normally operating electrochromic device comprising: (a) an anodic material and a cathodic material, wherein both of the anodic and cathodic materials are electroactive and at least one of the anodic and cathodic materials is electrochromic; (b) an additive; and (c) means associated with the additive for maintaining a colorless or nearly colorless electrochromic medium while such a medium is in a high transmission state relative to an electrochromic medium without the additive.

BRIEF DESCRIPTION OF THE DRAWINGS

The invention will now be described with reference to the drawings wherein.

DETAILED DESCRIPTION OF THE INVENTION

Figure 1:
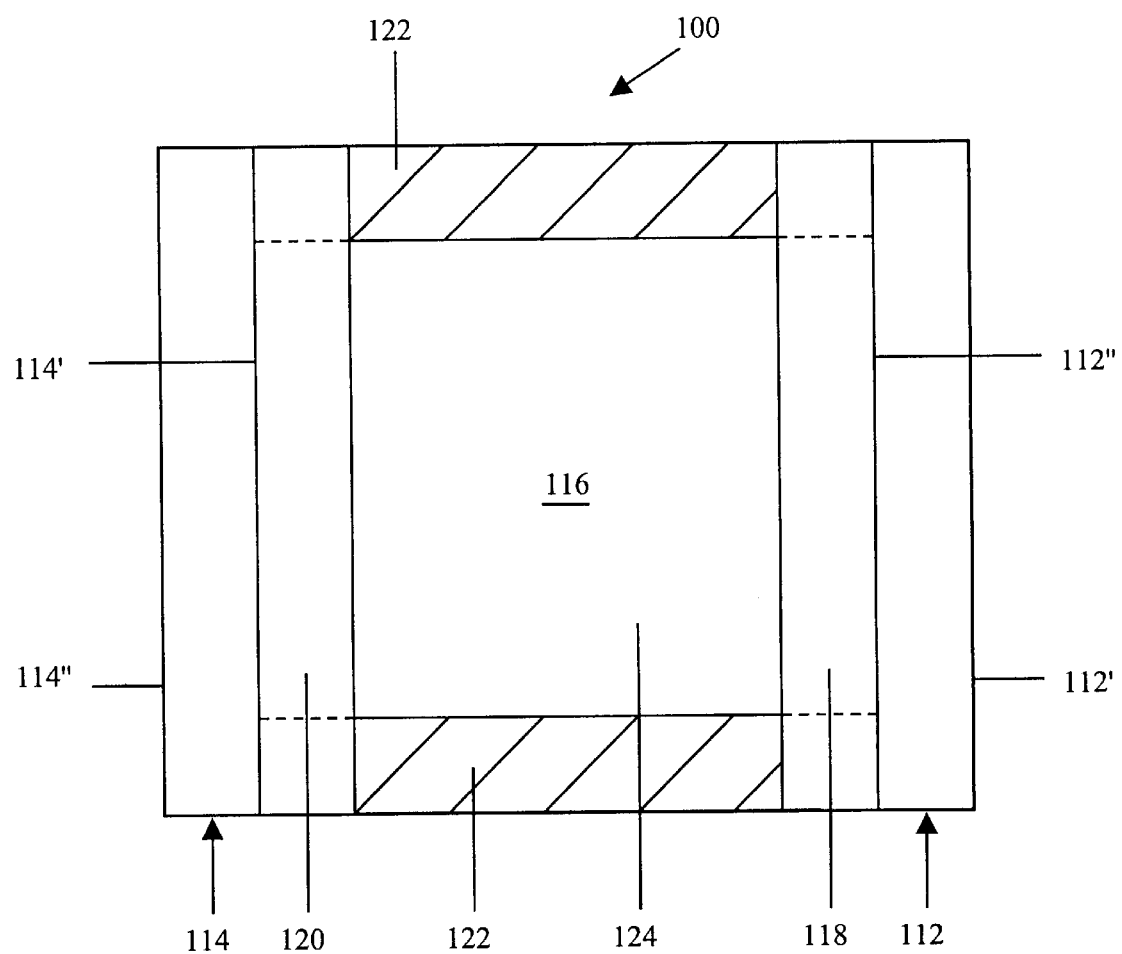
FIG. 1 of the drawings is a cross-sectional schematic representation of an electrochromic device fabricated in accordance with the present invention.

Referring now to the drawings and to FIG. 1 in particular, a cross-sectional schematic representation of electrochromic device 100 is shown, which generally comprises first substrate 112 having a front surface 112' and a rear surface 112," second substrate 114 having a front surface 114' and a rear surface 114," and chamber 116 for retaining electrochromic medium 124. It will be understood that electrochromic device 100 may comprise, for illustrative purposes only, a mirror, a window, a display device, a contrast enhancement filter, and the like. It will be further understood that FIG. 1 is merely a schematic representation of electrochromic device 100. As such, some of the components have been distorted from their actual scale for pictorial clarity. Indeed, numerous other electrochromic device configurations are contemplated for use, including those disclosed in U.S. Pat. No. 5,818,625, which is hereby incorporated by reference in its entirety.

First substrate 112 may be fabricated from any one of a number of materials that are transparent or substantially transparent in the visible region of the electromagnetic spectrum, such as, for example, borosilicate glass, soda lime glass, float glass, natural and synthetic polymeric resins or plastics including Topas®, which is commercially available from Ticona of Summit, N.J. First substrate 112 is preferably fabricated from a sheet of glass having a thickness ranging from approximately 0.5 millimeters (mm) to approximately 12.7 mm. Of course, the thickness of the substrate will depend largely upon the particular application of the electrochromic device. While particular substrate materials have been disclosed, for illustrative purposes only, it will be understood that numerous other substrate materials are likewise contemplated for use—so long as the materials are at least substantially transparent and exhibit appropriate physical properties, such as strength to be able to operate effectively in conditions of intended use. Indeed, electrochromic devices in accordance with the present invention can be, during normal operation, exposed to extreme temperatures as well as exposed to substantial UV radiation, emanating primarily from the sun.

Second substrate 114 can be fabricated from similar materials as that of first substrate 112. However, if the electrochromic device is a mirror, then the requisite of substantial transparency is not necessary. As such, second substrate 114 may, alternatively, comprise polymers, metals, glass, and ceramics—to name a few. Second substrate 114 is preferably fabricated from a sheet of glass having a thickness ranging from approximately 0.5 mm to approximately 12.7 mm. If first and second substrates 112 and 114, respectively, are fabricated from sheets of glass, then the glass can optionally be tempered prior to or subsequent to being coated with layers of electrically conductive material (118 and 120).

One or more layers of electrically conductive material 118 are associated with rear surface 112" of the first substrate. These layers serve as an electrode for the electrochromic device. Electrically conductive material 118 is desirably a material that: (a) is substantially transparent in the visible region of the electromagnetic spectrum; (b) bonds reasonably well to first substrate 112; (c) maintains this bond when associated with a sealing member; (d) is generally resistant to corrosion from materials contained within the electrochromic device or the atmosphere; and (e) exhibits minimal diffusion or specular reflectance as well as sufficient electrical conductance. It is contemplated that electrically conductive material 118 may be fabricated from fluorine doped tin oxide (FTO), for example TEC glass, which is commercially available from Libbey Owens-Ford-Co., of Toledo, Ohio, indium doped tin oxide (ITO), doped zinc oxide or other materials known in the art.

Electrically conductive material 120 is preferably associated with front surface 114' of second substrate 114, and is operatively bonded to electrically conductive material 118 by sealing member 122. As can be seen in FIG. 1, once bonded, the sealing member and the juxtaposed portions of electrically conductive materials 118 and 120 serve to define the inner peripheral geometry of chamber 116.

Electrically conductive material 120 may vary depending upon the intended use of the electrochromic device. For example, if the electrochromic device is a mirror, then the material may comprise a transparent conductive coating similar to electronically conductive material 118 (in which case a reflector is associated with rear surface 114" of second substrate 114). Alternatively, electrically conductive material 120 may comprise a layer of reflective material in accordance with the teachings of U.S. Pat. No. 5,818,625. In this case, electrically conductive material 120 is associated with front surface 114' of second substrate 114. Typical coatings for this type of reflector include chromium, rhodium, silver, silver alloys, and combinations thereof.

Sealing member 122 may comprise any material that is capable of being adhesively bonded to the electronically conductive materials 118 and 120 to, in turn, seal chamber 116 so that electrochromic medium 124 does not inadvertently leak out of the chamber. As is shown in dashed lines in FIG. 1, it is also contemplated that the sealing member extend all the way to rear surface 112" and front surface 114' of their respective substrates. In such an embodiment, the layers of electrically conductive material 118 and 120 may be partially removed where the sealing member 122 is positioned. If electrically conductive materials 118 and 120 are not associated with their respective substrates, then sealing member 122 preferably bonds well to glass. It will be understood that sealing member 122 can be fabricated from any one of a number of materials including, for example, those disclosed in U.S. Pat. Nos. 4,297,401, 4,418, 102, 4,695,490, 5,596,023, 5,596,024, 4,297,401, and U.S. patent application Ser. No. 09/158,423 entitled "Improved Seal For Electrochromic Devices," all of which are herein incorporated by reference.

For purposes of the present disclosure the electrochromic medium is disclosed herein below as being a solution phase medium. However, it will be understood that hybrid media and solid state media are likewise contemplated for use. In a hybrid medium, one of the anodic or cathodic materials can be applied (in a solid form) to its respective electrically conductive material. For example, a cathodic material, such as tungsten oxide ($WO_3$) can be applied onto the surface of a conventional electrically conductive material. In a solid state medium both of the anodic and cathodic materials can be applied in a solid form to their respective substrates. In such an embodiment, the additive may still be dissolved in the electrolyte positioned between the anodic and cathodic materials.

Electrochromic medium 124 is shown in FIG. 1, which generally comprises an anodic material, a cathodic material, and a color-stabilizing additive dissolved in at least one solvent. During normal operation of device 100, the color-stabilizing additive enables the electrochromic medium 124 to remain colorless or nearly colorless in the high transmission state. Typically both of the anodic and cathodic materials are electroactive and at least one of them is electrochromic. Regardless of its ordinary meaning, the term "electroactive" will be defined herein as a material that undergoes a modification in its oxidation state upon exposure to a particular electrical potential difference. Additionally, the term "electrochromic" will be defined herein, regardless of its ordinary meaning, as a material that has a change in its extinction coefficient at one or more wavelengths upon exposure to a particular electrical potential difference.

The cathodic material may include, for example, viologens, such as methyl viologen tetrafluoroborate or octyl viologen tetrafluoroborate. It will be understood that the preparation of the above-identified viologens is well known in the art. While specific cathodic materials have been provided, for illustrative purposes only, numerous other conventional cathodic materials are likewise contemplated for use including, but by no means limited to, those disclosed in U.S. Pat. No. 4,902,108, which is hereby incorporated in its entirety by reference. Indeed, the only contemplated limitation relative to the cathodic material is that it should not adversely affect the electrochromic performance of the device 100. Moreover, it is contemplated that the cathodic material may comprise a solid transition metal oxide, including, but not limited to, tungsten oxide.

The anodic material may comprise any one of a number of materials including ferrocene, substituted ferrocenes, substituted ferrocenyl salts, phenazine, substituted phenazines, phenothiazine, substituted phenothiazines. Examples of anodic materials may include di-tert-butyl-diethylferrocene, (6-(tetra-tert-butylferrocenyl)hexyl) triethylammonium tetrafluoroborate, (3-(tetra-tert-butylferrocenyl)propyl)triethylammonium tetrafluoroborate, 5,10-dimethylphenazine, and 3,7,10-trimethylphenothiazine. It will be understood that numerous other anodic materials are contemplated for use including those disclosed in the previously referenced and incorporated '108 patent.

For illustrative purposes only, the concentration of the anodic and cathodic materials can range from approximately 1 mM to approximately 500 mM and more preferably from approximately 5 mM to approximately 50 mM. While particular concentrations of the anodic as well as cathodic materials have been provided, it will be understood that the desired concentration may vary greatly depending upon the geometric configuration of the chamber containing electrochromic medium 124.

For purposes of the present disclosure, the solvent of the electrochromic medium may comprise any one of a number of materials including sulfolane, glutaronitrile, dimethyl sulfoxide, dimethyl formamide, acetonitrile, ethoxyethanol, tetraglyme and other similar polyethers, nitrites, such as 3-hydroxypropionitrile, hydroacrylonitrile, 2-methylglutaronitrile, 2-acetylbutyrolactone, cyclopentanone, cyclic esters including gamma-butyrolactone, propylene carbonate, ethylene carbonate and homogenous mixtures of the same. While specific solvents have been disclosed as being associated with the electrochromic medium, numerous other solvents are likewise contemplated for use.

In a first embodiment of the invention, the additive is more easily reduced than the cathodic material, and, during normal operation of the electrochromic device, serves to substantially preclude the formation of a residual reduced cathodic material while the device is in its high transmission state. The term "high transmission state" is defined as the bleached state, the unpowered state, the unactivated state and/or the open circuit state of the electrochromic device, or a state where it is desirous for the electrochromic medium within the device to be colorless or nearly colorless. As previously discussed, a residual reduced cathodic material can form from any one of a number of different reasons, and can leave the electrochromic medium undesirably tinted or colored, when it is desirous for the electrochromic medium to be colorless or nearly colorless.

In this first embodiment of the invention, the additive may comprise an oxidized form of the anodic material, or alternatively, the additive may comprise an additional material (other than the anodic material) present in an oxidized form. Preferably, the additive comprises a redox potential between that of both the anodic and cathodic materials. For example, the additive may comprise one or more materials such as ferrocinium salts, substituted ferrocinium salts, phenazinium salts, and substituted phenazinium salts. Specific materials may include, for example, di-tert-butyl-diethylferrocinium tetrafluoroborate, ( 6-(tetra-tert-butylferrocinium)hexyl)triethylammonium di-tetrafluoroborate, (3-(tetra-tert-butylferrocinium)propyl) triethylammonium di-tetrafluoroborate, 5-methylphenazinium tetrafluoroborate. Preferably the concentration of the additive ranges from approximately 0.01 mM to approximately 10 mM.

In a second embodiment of the invention, the additive comprises a reduced form of the cathodic material, and, during normal operation of the electrochromic device, serves to substantially preclude the formation of a residual oxidized anodic material while the device is in its high transmission state. Examples of suitable cathodic materials and their associated reduced species may include, for example, those identified below:

| Cathodic Material | Additive |
| --- | --- |
| $[Ru(NH_3)_6]^{3+}$ | $[Ru(NH_3)_6]^{2+}$ |
| $[Fe(CN)_6]^{3-}$ | $[Fe(CN)_6]^{4-}$ |
| $[Cr(bpy^*)_3]^{3+}$ | $[Cr(bpy^*)_3]^{2+}$ |
| $[PMo_{12}O_{40}^{}]^{3-}$ | $[PMo_{12}O_{40}^{}]^{4-}$ |

*wherein bpy is a bipyridine based ligand
**wherein $PMo_{12}O_{40}$ is a polyoxometalate complex It will be understood that only the electrochemically relevant portion of the complexes have been disclosed and that the above-identified complexes can be associated with any one of a number of cations or anions to form a neutral species. Preferably the concentration of the additive ranges from approximately 0.01 mM to approximately 10 mM.

In a third embodiment of the invention, the additive is more easily oxidized than the anodic material and is preferably selected from one or more materials, such as substituted ferrocenes, substituted ferrocenyl salts, and mixtures thereof. During normal operation of the electrochromic device, the additives comprising the third embodiment serve to substantially preclude the formation of a residual oxidized anodic material while the device is in its high transmission state. Specific examples of suitable materials include di-tert-butyl-diethylferrocene, (6-(tetra-tert-butylferrocenyl)hexyl) triethylammonium tetrafluoroborate, and (3-(tetra-tert-butylferrocenyl)propyl)triethylammonium tetrafluoroborate. While specific materials have been disclosed, for illustrative purposes only, numerous other materials that would be known to those having ordinary skill in the art having the present disclosure before them are likewise contemplated for use. Preferably the concentration of these additives ranges from approximately 0.01 mM to approximately 10 mM.

In a fourth embodiment of the invention, the additive comprises a first component that is more easily reduced than the cathodic material and a second component that is more easily oxidized than the anodic material. During normal operation of the electrochromic device, the first component serves to substantially preclude the formation of a residual reduced cathodic material and the second component serves to substantially preclude the formation of a residual oxidized anodic material while the device is in its high transmission state.

The first additive component may comprise either an oxidized form of the anodic material, or an additional electroactive material present in an oxidized form—or both with appropriate control of additive stoichiometry. Examples of suitable first components include ferrocinium salts, substituted ferrocinium salts, phenazinium salts, and substituted phenazinium salts. Specific materials may include, for example, di-tert-butyl-diethylferrocinium tetrafluoroborate, (6-(tetra-tert-butylferrocinium)hexyl) triethylammonium di-tetrafluoroborate, (3-(tetra-tert-butylferrocinium)propyl)triethylammonium di-tetrafluoroborate, and 5-methylphenazinium tetrafluoroborate.

The second additive component may comprise one or more materials, such as substituted phenazines, substituted ferrocenes, substituted ferrocenyl salts, and mixtures thereof. Specific materials may include, for example, 5-methylphenazine, (6-(tetra-tert-butylferrocenyl)hexyl) triethylammonium tetrafluoroborate, (3-(tetra-tert-butylferrocenyl)propyl)triethylammonium tetrafluoroborate, di-tert-butyl-diethylferrocene, and mixtures thereof. Preferably the concentration of both the first and second components each ranges from approximately 0.01 mM to approximately 10 mM.

It should be noted that the anodic and cathodic materials can be combined or linked by a bridging unit as described in International Application Serial No. PCT/WO97/EP498 entitled "Electrochromic System." It is also possible to link the anodic and cathodic materials by other conventional methods.

In addition, the electrochromic medium may also comprise other materials, such as light absorbers, light stabilizers, thermal stabilizers, antioxidants, viscosity modifiers including thickeners, and/or tint providing agents. Suitable UV-stabilizers may include: the material ethyl-2-cyano-3,3-diphenyl acrylate, sold by BASF of Parsippany, N.Y. under the trademark Uvinul N-35 and by Aceto Corp., of Flushing, N.Y. under the trademark Viosorb 910; the material (2-ethylhexyl)-2-cyano-3,3-diphenyl acrylate, sold by BASF under the trademark Uvinul N-539; the material 2-(2'-hydroxy-4'-methylphenyl)benzotriazole, sold by Ciba-Geigy Corp. under the trademark Tinuvin P; the material 2-hydroxy-4-methoxybezophenone sold by American Cyanamid under the trademark Cyasorb UV 9; and the material 2-ethyl-2'-ethoxyalanilide sold by Sandoz Color & Chemicals under the trademark Sanduvor VSU—to name a few. Thickeners include polymethylmethacrylate (PMMA) which is commercially available from, among other chemical suppliers, Aldrich Chemical Co.

It will be understood that during normal operation, the electrochromic devices of the present invention are intended to be cycled between a high transmission state and a low transmission state numerous times while maintaining a colorless or nearly colorless electrochromic medium during the high transmission state relative to an electrochromic medium without the additive.

Electrochromic devices having as a component part a color-stabilized electrochromic medium can be used in a wide variety of applications wherein the transmitted or reflected light can be modulated. Such devices include rear-view mirrors for vehicles; windows for the exterior of a building, home or vehicle; skylights for buildings including tubular light filters; windows in office or room partitions; display devices; contrast enhancement filters for displays; light filters for photographic devices and light sensors; and indicators for power cells as well as primary and secondary electrochemical cells.

The electrochromic media of the present invention utilize many different materials. The preparation and/or commercially available sources are provided herein, unless the material is well known in the art. It will be understood that, unless specified otherwise, the starting reagents are commercially available from Aldrich Chemical Co., Milwaukee, WI and other common chemical suppliers. It will be understood that conventional chemical abbreviations will be used when appropriate including the following: grams (g); milliliters (ml); moles (mol), millimoles (mmol), molar (M), and millimolar (mM).

Synthesis of (6-(tetra-tert-butvlferrocenyl)hexyl) triethylammonium tetrafluoroborate

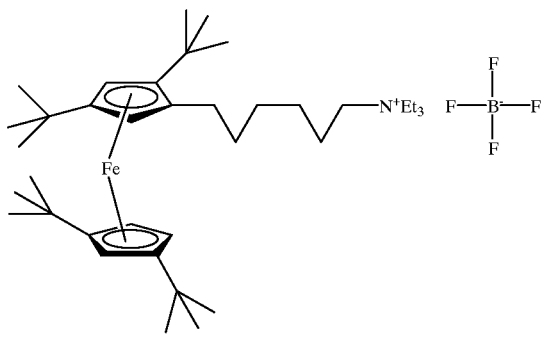

The synthesis of (6-(tetra-tert-butylferrocenyl)hexyl) triethylammonium tetrafluoroborate is a three step synthesis. First, 6-bromo-1-(tetra-tert-butylferrocenyl-2-hexanone is prepared. Second, the ketonic product is converted to 6-bromo-1-(tetra-tert-butylferrocenylhexane, which in turn, is subsequently converted into (6-(tetra-tertbutylferrocenyl) hexyl)triethyl-ammonium tetrafluoroborate.

Preparation of 6-bromo-1-(tetra-tert-butylferrocenyl-2-hexanone

First, a nitrogen purged flask was charged with 350 ml of dichloroethane, 50.0 g (122 mmol) of tetra-tert-butylferrocene (prepared according to T. Leigh, J. Am. Chem. Soc. 1964, 3294–3302), and 19.3 ml (126 mmol) of 6-bromohexanoyl chloride. Second, the solution was cooled to 0 degrees centigrade, whereupon 13.3 g (100 mmol) of $AlCl_3$ was charged into the reaction vessel in 3 equal portions at two hour intervals. It will be understood that the freshness and/or purity of the $AlCl_3$ can impact the degree of substitution of, for example, tert-butyl groups on a cyclopentadienyl ligand. Third, the reaction mixture was then slowly poured into 300 ml of agitating $H_2O$. Fourth, the organic-aqueous mixture was charged with a sufficient quantity of diethyl ether so that an organic layer was appreciably formed on top of the aqueous layer. Fifth, 50 ml of concentrated hydrochloric acid (HCl) was charged into the vessel. Sixth, approximately 2–5 g of zinc dust was charged into the vessel to reduce any ferrocinium species present in the aqueous layer to the ether soluble ferrocene. Once the layers were clearly defined, they were separated and the aqueous layer was extracted with 200 ml of diethyl ether ($Et_2O$). The two organic portions were combined and washed with $NaHCO_3$ and brine. Next the organic solution was dried over $MgSO_4$. The organic solution was then decanted from the $MgSO_4$ and filtered. Next, the solvent was removed by rotary evaporation to yield a red oil. The red oil was applied to a vacuum assisted silica gel column and washed with hexane to remove any residual ferrocene. The product was eluted with $Et_2O$. Upon solvent removal and cooling in a freezer, 64.29 g of 6-bromo-1-(tetra-tert-butylferrocenyl-2-hexanone was isolated as a red solid.

Preparation of 6-bromo-1-(tetra-tert-butylferrocenylhexane

First, 2.27 g (17.02 mmol) of $AlCl_3$ was dissolved in 200 ml of dry $Et_2O$ in a Schlenk flask under controlled, positive nitrogen pressure. Second, the solution was cooled to 0 degrees centigrade and 17.0 g (17.0 mmol) of 1.0 M $LiAlH_4$ was charged into the flask via syringe. The resulting suspension was warmed to room temperature and agitated for approximately 15 minutes. Next, 10.00 g (17.02 mmol) of the above prepared 6-bromo-1-(tetra-tert-butylferrocenyl-2-hexanone was slowly added to the suspension. Once the addition of the ketonic product was complete, the solution was heated to reflux for approximately 3 hours, after which time the solution was cooled to room temperature. The reaction was then quenched by slowly adding $H_2O$ to the solution. When no further exothermic reaction was observed, 250 ml of $H_2O$ was added to dilute the solution. The solution was then transferred to a separatory funnel, whereupon the organic layer was collected and the aqueous layer was extracted with 100 ml of $Et_2O$. The organic portions were combined and then washed with $NaHCO_3$ and brine. Next, the solution was dried over $MgSO_4$ The solution was then decanted from the drying agent and filtered. Next, the solvent was removed via rotary evaporation yielding a yellow-orange oil. The oil was dissolved in a small amount of hexane, applied to a vacuum assisted gel column, and eluted with more hexane. Upon solvent removal, 8.73 g of 6-bromo-1-(tetra-tert-butylferrocenylhexane was isolated as a yellow-orange solid.

Preparation of (6-(tetra-tert-butylferrocenyl)hexyl) triethylammonium tetrafluoroborate First, 87.5 ml (628 mmol) of triethylamine ($NEt_3$), and 53.1 g (92.6 mmol) of 6-bromo-1-(tetra-tert-butylferrocenylhexane, and 50 ml of acetonitrile were charged into a reaction vessel. The solution was then heated to reflux for 4 days. During this time the reaction was periodically monitored by thin layer chromatography (TLC) using hexane as the eluent, for the disappearance of the starting material. After cooling to room temperature, the solvent was removed by rotary evaporation and the product was precipitated by addition of $Et_2O$. The bromide salt of the product was collected on a filter frit, and washed with several portions of cold $Et_2O$. Next, the salt was dried in vacuo to yield an orange solid. An anion exchange was then performed by dissolving $NaBF_4$ in water and subsequently removing residual solid particles via filtration. Next the bromide salt of the product was dissolved in Methanol (MeOH) and the $NaBF_4$ dissolved in water was added to the bromide salt solution. The methanol was slowly removed via rotary evaporation until the product began to precipitate. The orange precipitate was collected on a filter frit, and the recrystallization process was repeated. Finally the precipitate was dissolved in a minimum amount of MeOH, and $Et_2O$ was added slowly to precipitate (6-(tetra-tert-butylferrocenyl)hexyl)triethylammonium tetrafluoroborate, an orange solid, which was collected on a frit, dried in vacuo, and stored for later use.

It will be understood that shorter and longer alkyl chain substituted groups, such as a propyl alkyl chain derivative can likewise be synthesized using shorter or longer alkyl chain precursor reagents.

Synthesis of (6-(tetra-tert-butylferrocinium)hexyl) triethylammonium di-tetrafluoroborate

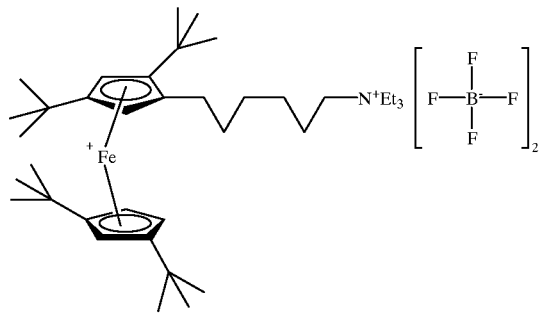

First, 10.00 g (14.67 mmol) of the above-prepared (6-(tetra-tert-butylferrocenyl)-hexyl)triethylammonium tetrafluoroborate was dissolved in 150 ml of dichloromethane ($CH_2Cl_2$). Next 5.0 g (25.7 mmol) of $AgBF_4$ was added in 2 equal portions at a 5 minute interval. After agitating for 30 minutes, the solution was filtered and the solvent was removed by rotary evaporation, yielding a green solid. The green solid was redissolved in a minimal amount of $CH_2Cl_2$ and the product was precipitated by the addition of $Et_2O$. The solid was dried in vacuo to yield 10.57 g of (6-(tetra-tert-butylferrocinium)hexyl)-triethylammonium tetrafluoroborate as a dark green, crystalline solid.

11
Synthesis of Di-tert-butyl-diethylferrocene

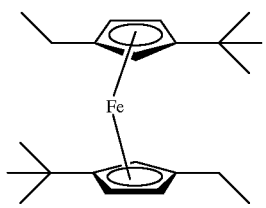

First, a reaction flask was thoroughly purged with nitrogen and charged with 300 ml of dichloroethane, 10.0 g (33.53 mmol) of di-tert-butylferrocene (prepared according to T. Leigh, J. Am. Chem. Soc. 1964, 3294–3302), and 7.44 ml (100.6 mmol) of freshly distilled acetyl bromide. The solution was agitated, cooled to 0 degrees centigrade, and charged with 8.94 g (67.06 mmol) of $AlCl_3$. The solution was held at 0 degrees centigrade for one hour and then warmed to room temperature. Agitation was maintained throughout the holding and warming periods. The reaction mixture was then transferred into a beaker containing a mixture of agitating ice and dilute HCl. Next, $Et_2O$ was added to form an organic layer on top of the aqueous layer. The organic layer was separated—via separatory funnel and the aqueous layer was extracted with 200 ml of $Et_2O$. The organic portions were combined and washed with $NaHCO_3$ and brine and then dried over $MgSO_4$. Next, the solution was decanted from the $MgSO_4$ and placed on a rotary evaporator to remove the solvent, which yielded a red oil. The red oil was applied to a silica gel column and washed with hexane to strip any residual starting material from the product. The ketonic product was then eluted with a mixture of ethyl acetate (EtOAc)/hexane (30:70 by vol.) Upon solvent removal, 5.55 g of di-tert-butyl-diacetylferrocene was collected.

After the di-tert-butyl-diacetylferrocene was prepared, a Schienk flask under positive nitrogen pressure was charged with 25 ml of dry $Et_2O$. Second 0.35 g (2.61 mmol) of $AlCl_3$ was charged into the reaction flask. Agitation was initiated and the $AlCl_3$ dissolved into solution. Third, 5.23 ml (5.23 mmol) of 1M $LiAlH_4$ in $Et_2O$ was charged into the reaction flask via syringe. The resulting suspension was agitated for approximately 15 minutes. Fourth, 1.00 g (2.62 mmol) of the above-prepared di-tert-butyl-diacetylferrocene was slowly charged into the reaction vessel. Next, the solution was heated to reflux for approximately 3 hours and then cooled to room temperature overnight with continuous agitation. The reaction was then quenched by the slow addition of wet $Et_2O$ to the solution. The organic layer was separated from the aqueous layer—via separatory funnel. Next, the aqueous layer was extracted with 100 ml of $Et_2O$. The organic portions were combined and washed with $H_2O$ and brine, which was followed by drying over $MgSO_4$. The solution was decanted from the drying agent and filtered. Next the solvent was stripped via rotary evaporation, which yielded a yellow-orange oil. The oil was dissolved in a small amount of hexane, applied to a vacuum assisted silica gel column, and eluted with more hexane. Upon solvent removal, 0.627 g of di-tert-butyl-diethylferrocene was collected and stored for later use.

12
Synthesis of Di-tert-butyl-diethylferrocinium tetrafluoroborate

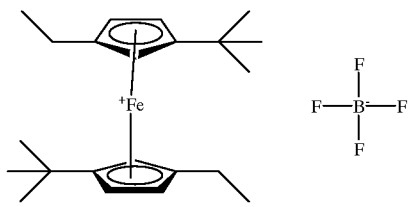

First, 0.50 g (1.41 mmol) of the above-prepared di-tert-butyl-diethylferrocene, 20 ml of $CH_2Cl_2$, and 0.282 g (1.45 mmol) of $AgBF_4$ were charged into a reaction vessel, whereupon agitation was initiated. After approximately 2 hours of agitation, the solution was filtered and the solvent was removed by rotary evaporation, yielding a green solid. The green solid was recrystallized by layered, solvent diffusion of $Et_2O$ into a concentrated solution of crude di-tert-butyl-diethylferrocinium $BF_4$ in $CH_2Cl_2$. The solid was dried under vacuum to yield 0.51 g of di-tert-butyl-diethylferrocinium $BF_4$ as a dark green, crystalline solid.

In support of the present invention, several experiments were conducted wherein electrochromic devices were prepared which comprised a color-stabilizing additive, the color-stabilized performance of which were compared to analogous devices fabricated without a color-stabilizing additive.

In discussing colors it is useful to refer to the Commission Internationale de l'Eclairage's (CIE) 1976 CIELAB Chromaticity Diagram (commonly referred to the La*b* chart). The technology of color is relatively complex, but a fairly comprehensive discussion is given by F. W. Billmeyer and M. Saltzman in Principles of Color Technology, $2^{nd}$ Ed., J. Wiley and Sons Inc. (1981), and the present disclosure, as it relates to color technology and terminology generally follows that discussion. On the La*b* chart, L defines lightness, a* denotes the red/green value and b* denotes the yellow/blue value. Each of the electrochromic media has an absorption spectra at each particular voltage that may be converted into a three number designation, their La*b* values. However, for the present discussion, the a* and b* values are most relevant inasmuch as: (1) a medium with an increased a* value is more red; (2) a medium with a decreased a* value is more green; (3) a medium with an increased b* value is more yellow; and (4) a medium with a decreased b* value is more blue.

It will be understood that in each of the experiments provided below, the electrochromic materials were dissolved in propylene carbonate (PC).

Experiment No. 1

In this experiment two electrochromic media were prepared by mixing the following materials together in the concentrations provided below:

| | Experiment No. 1A | |
|---|---|---|
| Component | Material | Concentration |
| Cathodic | Octylviologen $BF_4$ | 34.0 mM |
| Anodic | 5,10-Dimethylphenazine | 26.5 mM |

Experiment No. 1A -continued

| Component | Material | Concentration |
|---|---|---|
| Additive | None | — |
| Uv-Stabilizer | T-butylpentylester of Tinuvin P* | 50.0 mM |
| Uv-Stabilizer | Tinuvin P | 30.0 mM |
| Thickener | PMMA | 3% by wt. |

*a.k.a. 3-[3-(2H-benzotriazole-2-yl)-5-(1,1-dimethylethyl)-4-hydroxyphenyl]propionic acid pentyl ester

Experiment No. 1B

| Component | Material | Concentration |
|---|---|---|
| Cathodic | Octylviologen $BF_4$ | 34.0 mM |
| Anodic | 5,10-Dimethylphenazine | 26.5 mM |
| Additive | (6-(tetra-tert-butylferrocenyl)hexyl)-triethylammonium $BF_4$ | 5.0 mM |
| Uv-Stabilizer | T-butylpentylester of Tinuvin P | 50.0 mM |
| Uv-Stabilizer | Tinuvin P | 30.0 mM |
| Thickener | PMMA | 3% by wt. |

Each of the media were associated with an electrochromic mirror for testing. Specifically, the mirror comprised two 2×5 inch substrates. The first substrate was coated with generally clear, conductive fluorine doped tin oxide, and the second was coated with fluorine doped tin oxide with a silver reflector on rear surface (114"). The substrates were spaced 137 microns apart for accommodating the medium.

As can be seen, Experiment No. 1A does not include an additive and Experiment No. 1B comprises (6-(tetra-tert-butylferrocenyl)hexyl)triethylammonium $BF_4$ as an additive. In order to simulate a harsh oxidative environment, each of the above-prepared media were placed into a conventional autoclave with an oxygen input line at 400 p.s.i. at ambient temperature. The media were then evaluated for their color stability by obtaining La*b* values at ntervals. The La*b* data for Experiment Nos. 1A and 1B are provided below.

Experiment No. 1-Autoclave

| Experiment No. 1A | | | | Experiment No. 1B | | | |
|---|---|---|---|---|---|---|---|
| Hours | L | a* | b* | Hours | L | a* | b* |
| 0 | 88.93 | −5.25 | 8.59 | 0 | 89.22 | −4.78 | 9.35 |
| 168 | 89.25 | −5.44 | 8.64 | 168 | 89.52 | −4.9 | 9.3 |
| 336 | 89.07 | −5.97 | 9.85 | 336 | 89.31 | −5.04 | 9.69 |
| 504 | 88.94 | −6.49 | 11.18 | 504 | 89 | −5.27 | 10.44 |
| 672 | 88.39 | −7.44 | 14.11 | 672 | 88.81 | −5.82 | 12.25 |
| 840 | 87.72 | −8.34 | 17.76 | 840 | 88.48 | −6.47 | 14.87 |
| 1008 | 87.41 | −8.37 | 19.06 | 1008 | 88.41 | −6.4 | 15.38 |
| 1176 | 87.1 | −8.84 | 20.99 | 1176 | 88.26 | −6.44 | 16.09 |
| 1344 | 86.9 | −8.44 | 21.29 | 1344 | 87.96 | −6.34 | 16.4 |
| 1512 | 86.57 | −8.44 | 22.2 | 1512 | 87.66 | −6.4 | 16.92 |
| 1680 | 86.2 | −8.44 | 23.58 | 1680 | 87.17 | −6.81 | 18.49 |
| 1848 | 85.53 | −8.97 | 25.68 | 1848 | 87.01 | −6.79 | 19.11 |
| 2016 | 84.84 | −10.01 | 28.97 | 2016 | 86.61 | −6.67 | 19.47 |

Figure 2:
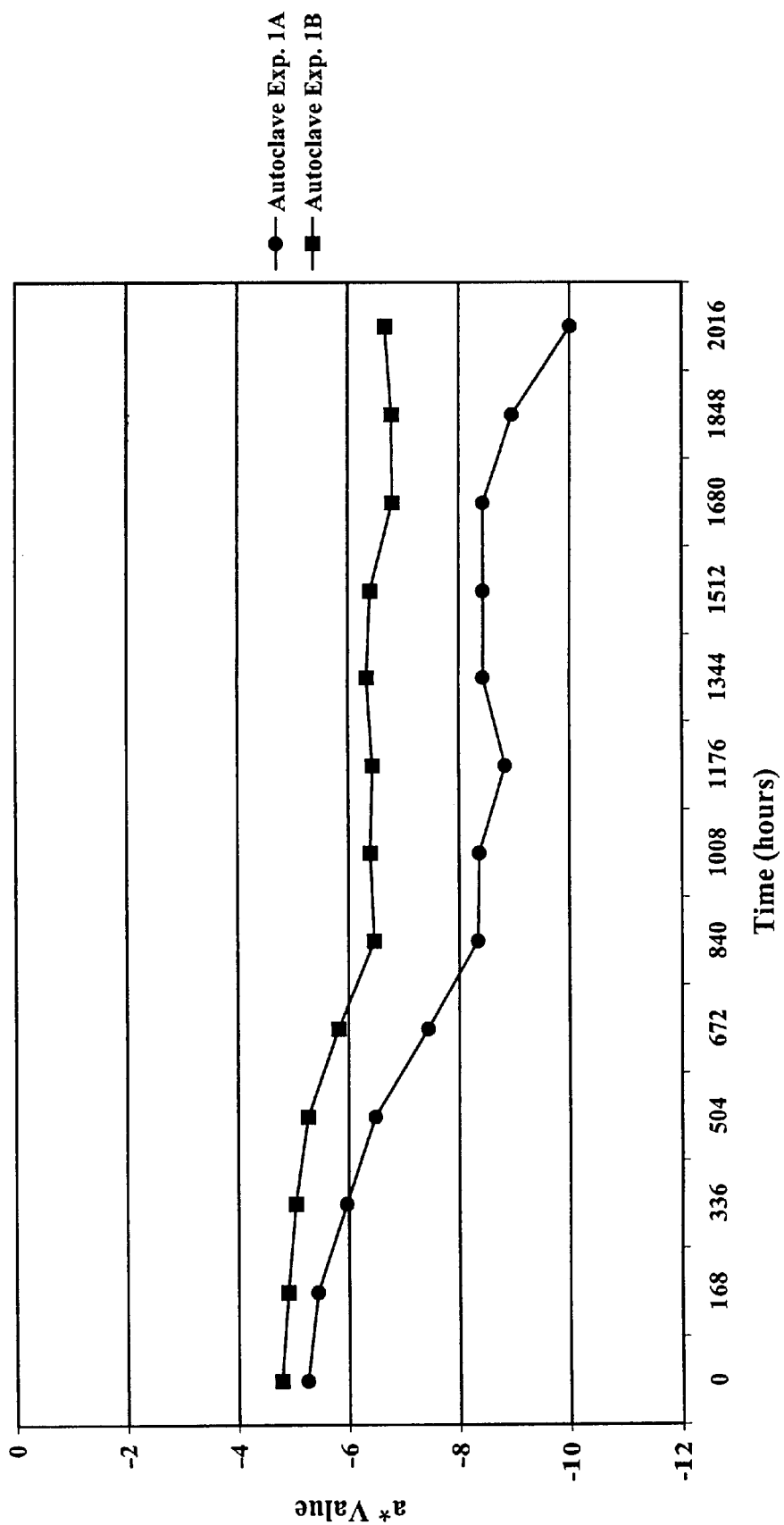
FIG. 2 of the drawings is a two-dimensional plot showing the change in a* value as a function of exposure time to an oxidative environment for Experiments 1A–1B.
Figure 3:
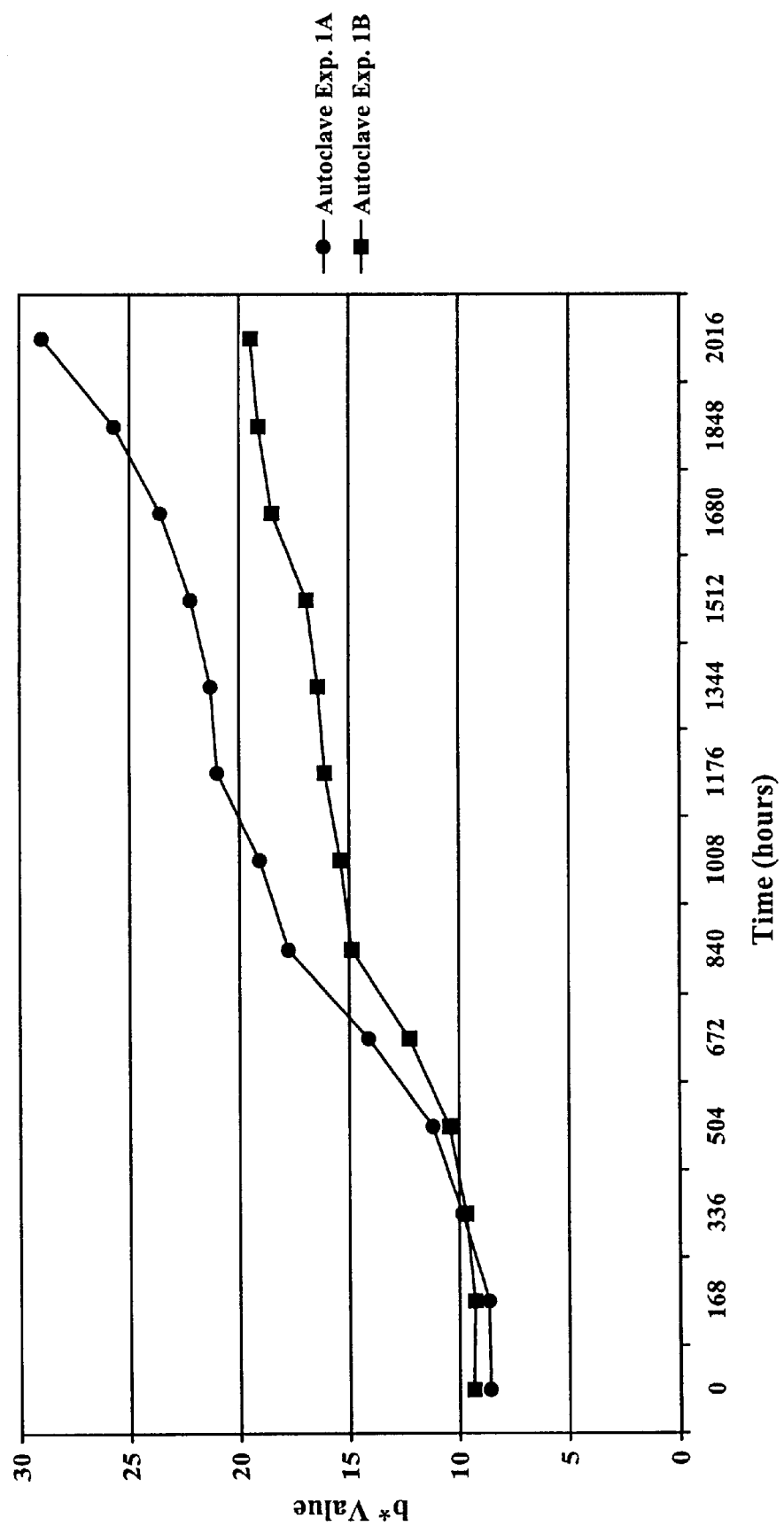
FIG. 3 of the drawings is a two-dimensional plot showing the change in b* value as a function of exposure time to an oxidative environment for Experiments 1A–1B.

Overall, the medium without the additive is turning substantially more green, which is shown in FIG. 2 as an increasing negative a* value and in FIG. 3 as an increasing b* value. Therefore Experiment No. 1 verifies that, indeed, the usage of the above-identified additive provides an effective mechanism to minimize the adverse coloration effects associated with oxidative environments.

Experiment No. 2

In this experiment four electrochromic media were prepared by mixing the following materials together in the concentrations provided below:

Experiment No. 2A

| Component | Material | Concentration |
|---|---|---|
| Cathodic | Octylviologen $BF_4$ | 34.0 mM |
| Anodic | 3,7,10-trimethylphenothiazine | 26.5 mM |
| Additive | None | — |
| UV-Stabilizer | Tinuvin P | 30.0 mM |
| Thickener | PMMA | 3% by wt. |

Experiment No. 2B

| Component | Material | Concentration |
|---|---|---|
| Cathodic | Octylviologen $BF_4$ | 34.0 mM |
| Anodic | 3,7,10-trimethylphenothiazine | 26.5 mM |
| Additive | (6-(tetra-tert-butylferrocenyl)hexyl)-triethylammonium $BF_4$ | 2.0 mM |
| UV-Stabilizer | Tinuvin P | 30.0 mM |
| Thickener | PMMA | 3% by wt. |

Experiment No. 2C

| Component | Material | Concentration |
|---|---|---|
| Cathodic | Octylviologen $BF_4$ | 34.0 mM |
| Anodic | 3,7,10-trimethylphenothiazine | 26.5 mM |
| Additive | (6-(tetra-tert-butylferrocinium)hexyl)-triethylammonium$(BF_4)_2$ | 2.0 mM |
| UV-Stabilizer | Tinuvin P | 30.0 mM |
| Thickener | PMMA | 3% by wt. |

Experiment No. 2D

| Component | Material | Concentration |
|---|---|---|
| Cathodic | Octylviologen $BF_4$ | 34.0 mM |
| Anodic | 3,7,10-trimethylphenothiazine | 26.5 mM |
| First Additive | (6-(tetra-tert-butylferrocenyl)hexyl)-triethylammonium $BF_4$ | 2.0 mM |
| Second Additive | (6-(tetra-tert-butylferrocinium)hexyl)-triethylammonium$(BF_4)_2$ | 2.0 mM |
| UV-Stabilizer | Tinuvin P | 30.0 mM |
| Thickener | PMMA | 3% by wt. |

As can be seen, Experiment No. 2A does not include an additive and Experiment Nos. 2B–2D comprise different ferrocene complexes as additives. Each of the media (2A–2D) were associated with an electrochromic mirror similar in construction to those described in Experiment No. 1 for color stabilization testing. Duplicate sets of mirrors were constructed, half of which were placed in an autoclave under the same conditions identified in Experiment No. 1, while the other half were stored at 85 degrees centigrade to simulate exposure to prolonged elevated temperatures. The La*b* data was collected at predetermined intervals, which is provided below.

Experiment No. 2-Autoclave

| Experiment No. 2A | | | | Experiment No. 2B | | | |
|---|---|---|---|---|---|---|---|
| Hours | L | a* | b* | Hours | L | a* | b* |
| 0 | 88.44 | −3.45 | 7.76 | 0 | 88.8 | −3.54 | 7.81 |
| 168 | 88.81 | −3.46 | 7.67 | 168 | 88.93 | −3.62 | 7.7 |
| 336 | 88.67 | −3.63 | 8.19 | 336 | 88.8 | −3.73 | 7.78 |
| 504 | 88.62 | −3.49 | 8.28 | 504 | 88.9 | −4 | 7.7 |
| 672 | 87.86 | −3.75 | 9.82 | 672 | 88.75 | −4.25 | 7.83 |
| 840 | 86.76 | −3.35 | 10.94 | 840 | 88.28 | −4.21 | 8.2 |
| 1008 | 86.45 | −3.31 | 12.04 | 1008 | 88.04 | −4.53 | 8.89 |
| 1176 | 86.33 | −3.92 | 13.45 | 1176 | 87.78 | −4.96 | 10.07 |
| 1344 | 86.01 | −4.03 | 14.76 | 1344 | 87.8 | −5.59 | 12.3 |
| 1512 | 85.71 | −4.1 | 15.67 | 1512 | 87.4 | −5.82 | 13.93 |
| 1680 | 84.64 | −2.99 | 15.62 | 1680 | 87.41 | −6.12 | 14.96 |
| 1848 | 83.59 | −1.68 | 15.15 | 1848 | 87.21 | −6.39 | 16.33 |
| 2016 | 82.44 | 0.08 | 14.36 | 2016 | 87.13 | −6.77 | 17.93 |
| 2184 | 81.42 | 0.75 | 14.09 | 2184 | 86.95 | −6.82 | 18.79 |
| 2352 | 80.99 | 2 | 13.55 | 2352 | 86.58 | −6.42 | 18.89 |

| Experiment No. 2C | | | | Experiment No. 2D | | | |
|---|---|---|---|---|---|---|---|
| Hours | L | a* | b* | Hours | L | a* | b* |
| 0 | 88.16 | −4.35 | 8.16 | 0 | 88.38 | −3.96 | 8.15 |
| 168 | 88.5 | −4.46 | 8.26 | 168 | 88.51 | −3.87 | 7.95 |
| 336 | 88.15 | −4.46 | 8.51 | 336 | 88 | −3.82 | 7.94 |
| 504 | 88.06 | −4.5 | 8.86 | 504 | 88.4 | −3.9 | 7.93 |
| 672 | 87.46 | −4.76 | 9.83 | 672 | 87.67 | −4.09 | 8.66 |
| 840 | 86.98 | −4.88 | 10.87 | 840 | 87.15 | −3.98 | 9.26 |
| 1008 | 86.71 | −5.15 | 11.92 | 1008 | 87 | −4.07 | 10.02 |
| 1176 | 86.51 | −5.54 | 13.25 | 1176 | 86.47 | −4.23 | 11.34 |
| 1344 | 85.61 | −4.45 | 13.02 | 1344 | 86.17 | −4.35 | 12.6 |
| 1512 | 84.66 | −3.16 | 12.62 | 1512 | 85.93 | −4.53 | 13.63 |
| 1680 | 82.3 | −0.54 | 11.5 | 1680 | 85.45 | −4.77 | 14.32 |
| 1848 | 81.94 | 0.51 | 11.28 | 1848 | 85.93 | −5.21 | 15.21 |
| 2016 | 80.37 | 2.3 | 10.63 | 2016 | 85.96 | −5.6 | 16.31 |
| 2184 | 80.33 | 2.72 | 10.73 | 2184 | 85.9 | −5.74 | 17.25 |
| 2352 | 79.46 | 3.91 | 10.46 | 2352 | 86.05 | −5.81 | 17.61 |

Experiment No. 2-Thermal

| Experiment No. 2A | | | | Experiment No. 2B | | | |
|---|---|---|---|---|---|---|---|
| Hours | L | a* | b* | Hours | L | a* | b* |
| 0 | 88.3 | −3.86 | 8.67 | 0 | 88.55 | −3.98 | 8.49 |
| 167 | 87.34 | −3.81 | 6.99 | 167 | 86.76 | −4.41 | 6.15 |
| 314 | 83.04 | −5.69 | 1.29 | 314 | 82.74 | −6.25 | 0.72 |
| 478 | 79.62 | −6..73 | 2.58 | 478 | 81.28 | −6.65 | −1.07 |
| 651 | 77.62 | −7.54 | −5.35 | 651 | 80.37 | −7.06 | −2.23 |
| 840 | 77.43 | −7.3 | −5.58 | 840 | 81.15 | −6.63 | −1.07 |
| 1025 | 75.06 | −8.05 | −8.39 | 1025 | 80.54 | −6.91 | −1.35 |
| 1193 | 75.34 | −7.86 | −7.75 | 1193 | 80.53 | −6.78 | −1.37 |
| 1375 | 75.65 | −8.24 | −7.41 | 1375 | 80.03 | −7.06 | −1.98 |
| 1543 | 74.97 | −7.98 | −8.44 | 1543 | 79.88 | −6.92 | −2.29 |
| 1785 | 74.44 | −7.93 | −8.74 | 1785 | 79.75 | −6.98 | −2.22 |
| 1972 | 74.28 | −8.06 | −8.19 | 1972 | 78.95 | −7.27 | −3.07 |
| 2261 | 74.94 | −7.56 | −8.03 | 2261 | 79.17 | −7.03 | −2.95 |

| Experiment No. 2C | | | | Experiment No. 2D | | | |
|---|---|---|---|---|---|---|---|
| Hours | L | a* | b* | Hours | L | a* | b* |
| 0 | 87.88 | −5.14 | 9.26 | 0 | 88.26 | −4.46 | 8.73 |
| 167 | 88.04 | −4.34 | 8.16 | 167 | 88.35 | 4.05 | 8.17 |
| 314 | 88.06 | −4.21 | 8.11 | 314 | 88.28 | −3.91 | 8.09 |
| 478 | 87.98 | −4.11 | 8.02 | 478 | 88.2 | −3.92 | 7.97 |
| 651 | 87.94 | −4.03 | 8.06 | 651 | 88.06 | −3.96 | 7.8 |
| 840 | 87.86 | −3.94 | 7.94 | 840 | 87.68 | −4.06 | 7.41 |
| 1025 | 87.8 | −3.88 | 8.19 | 1025 | 87.26 | −4.26 | 7.03 |
| 1193 | 87.76 | −3.92 | 8.19 | 1193 | 87.07 | −4.42 | 6.79 |
| 1375 | 87.81 | −3.9 | 8.29 | 1375 | 86.49 | −4.61 | 6.32 |
| 1543 | 87.72 | −3.83 | 8.12 | 1543 | 86.54 | −4.57 | 6.1 |
| 1785 | 87.61 | −3.87 | 8.15 | 1785 | 86.28 | −4.59 | 6.1 |
| 1972 | 87.63 | −3.82 | 8.23 | 1972 | 86.16 | −4.87 | 5.72 |
| 2261 | 87.58 | −3.74 | 8.06 | 2261 | 85.86 | −4.56 | 5.75 |

Figure 4:
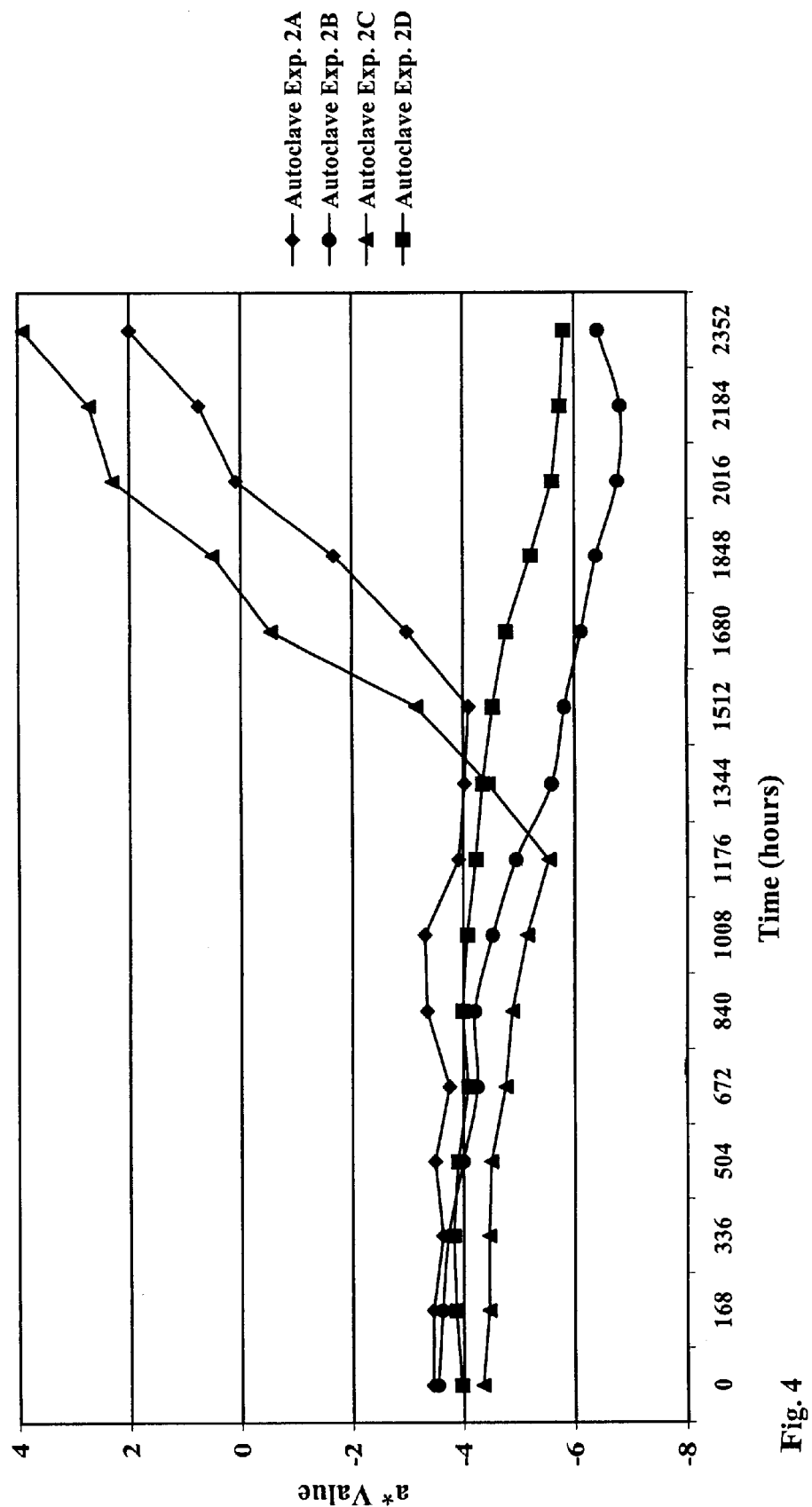
FIG. 4 of the drawings is a two-dimensional plot showing the change in a* value as a function of exposure time to an oxidative environment for Experiments 2A–2D.
Figure 5:
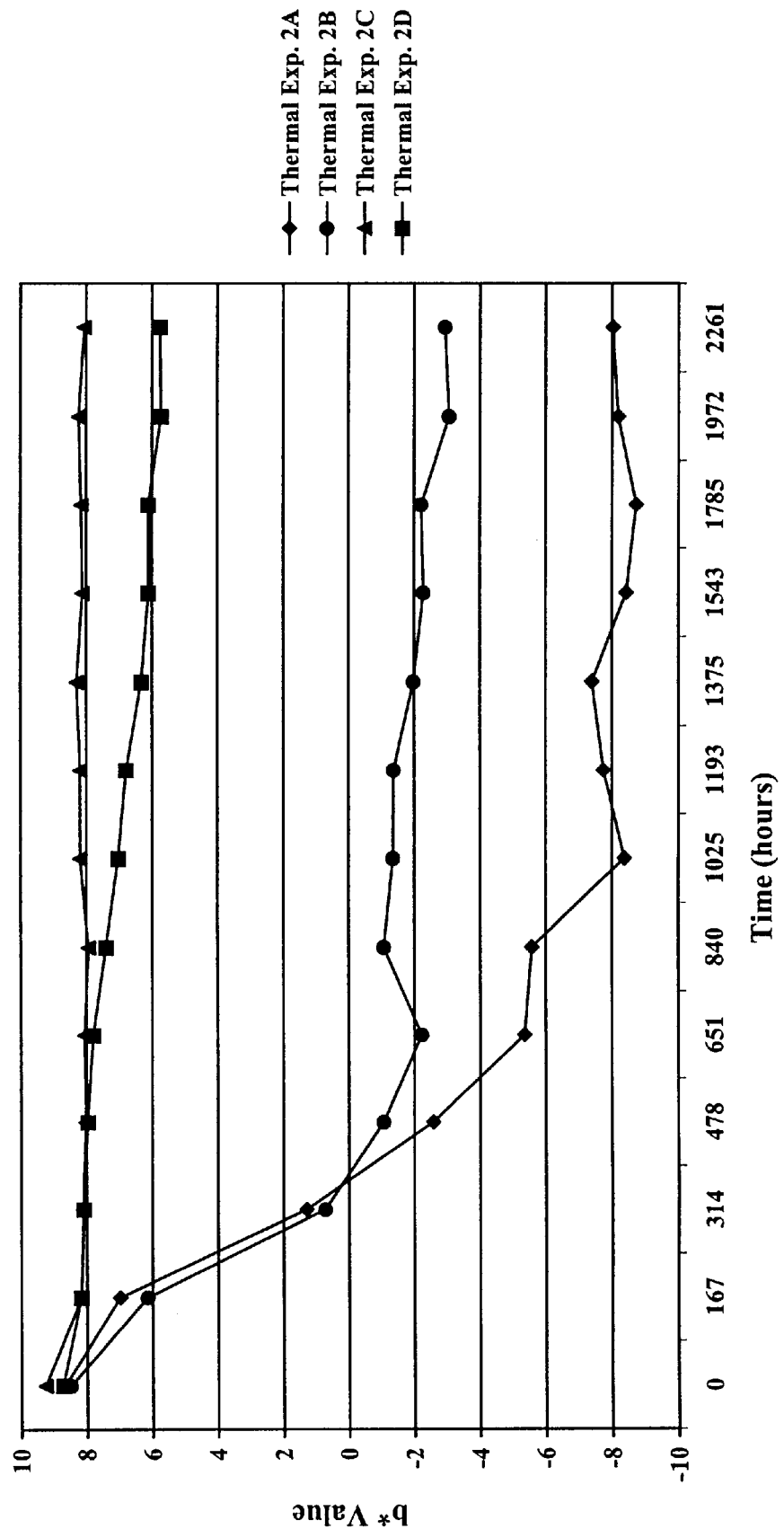
FIG. 5 of the drawings is a two-dimensional plot showing the change in b* value as a function of exposure time to elevated temperatures for Experiments 2A–2D.

In reference to the autoclave experiment, FIG. 4 depicts that the media without the ferrocenyl additive (Autoclave Exp. 2A,2C) are turning more red (the positive a* value) than the media with the ferrocenyl additive (Autoclave Exp. 2B–2D). FIG. 5 graphically indicates the b* values for the media (Thermal Exp. 2A–2D) that were associated with mirrors stored at an elevated temperature. In particular, the media comprising a ferrocinium additive (Thermal Exp. 2C,2D) do not appreciably decrease in b* value. In comparison, the media without the ferrocinium additive begin to "fail" or turn blue almost immediately.

In addition, FIGS. 4 and 5 collectively demonstrate that a medium comprising both ferrocenyl as well as ferrocinium species maintains relatively constant a* and b* values in both oxidative and prolonged elevated temperature environments.

Experiment No. 3

In this experiment two electrochromic media were prepared by mixing the following materials together in the concentrations provided below:

Experiment No. 3A

| Component | Material | Concentration |
|---|---|---|
| Cathodic | Methylviologen $BF_4$ | 34.0 mM |
| Anodic | (6-(tetra-tert-butylferrocenyl)hexyl)-triethylammonium $BF_4$ | 21.8 mM |
| Additive | None | — |
| UV-Stabilizer | T-butylpentylester of Tinuvin P | 50.0 mM |
| Uv-Stabilizer | Tinuvin P | 30.0 mM |
| Thickener | PMMA | 3% by wt. |

Experiment No. 3B

| Component | Material | Concentration |
|---|---|---|
| Cathodic | Methylviologen $BF_4$ | 34.0 mM |
| Anodic | (6-(tetra-tert-butylferrocenyl)hexyl)-triethylammonium $BF_4$ | 21.8 mM |
| Additive | (6-(tetra-tert-butylferrocinium)hexyl)-triethylammomium$(BF_4)_2$ | 2.0 mM |
| UV-Stabilizer | T-butylpentylester of Tinuvin P | 50.0 mM |
| UV-Stabilizer | Tinuvin P | 30.0 mM |
| Thickener | PMMA | 3% by wt. |

As can be seen, Experiment No. 3A does not include an additive and Experiment No. 3B comprises (6-(tetra-tert-butylferrocinium)hexyl)triethyl-ammonium $BF_4$ as an additive. The media from Experiments 3A and 3B were placed into electrochromic windows configured similar to the mirrors as disclosed in Experiment No. 2, except that a reflector was not associated with the rear surface (114") of the second substrate and the cell spacing was 250 microns instead of 137 microns. The windows were stored at 85 degrees centigrade and La*b* data was collected at predetermined intervals, which is provided below.

Experiment No. 3-Thermal

| Experiment No. 3A | | | | Experiment No. 3B | | | |
|---|---|---|---|---|---|---|---|
| Hours | L | a* | b* | Hours | L | a* | b* |
| 0 | 81.15 | −4.01 | 19.45 | 0 | 80.28 | −5.44 | 19.85 |
| 267 | 81.18 | −3.71 | 19.60 | 267 | 80.33 | −5.15 | 20.07 |
| 530 | 80.75 | −3.88 | 19.12 | 530 | 80.24 | −5.05 | 20.34 |
| 677 | 79.66 | −4.39 | 17.55 | 677 | 80.24 | −4.98 | 20.11 |
| 841 | 78.68 | −4.88 | 16.30 | 841 | 80.29 | −5.02 | 20.20 |
| 1014 | 77.44 | −5.36 | 14.04 | 1014 | 80.19 | −4.78 | 20.35 |
| 1203 | 76.98 | −5.77 | 13.58 | 1203 | 80.30 | −5.03 | 20.16 |
| 1388 | 74.86 | −6.45 | 10.64 | 1388 | 80.12 | −4.74 | 20.48 |
| 1556 | 75.07 | −6.60 | 10.91 | 1556 | 80.32 | −4.89 | 20.27 |
| 1738 | 73.85 | −6.96 | 9.21 | 1738 | 80.27 | −4.71 | 20.28 |
| 1906 | 73.65 | −6.96 | 9.12 | 1906 | 80.20 | −4.82 | 20.70 |
| 2148 | 73.13 | −7.30 | 8.02 | 2148 | 80.20 | −4.76 | 20.53 |
| 2335 | 71.31 | −7.60 | 5.98 | 2335 | 79.82 | −4.28 | 20.68 |
| 2624 | 71.30 | −7.77 | 5.65 | 2624 | 79.80 | −4.64 | 20.77 |

Figure 6:
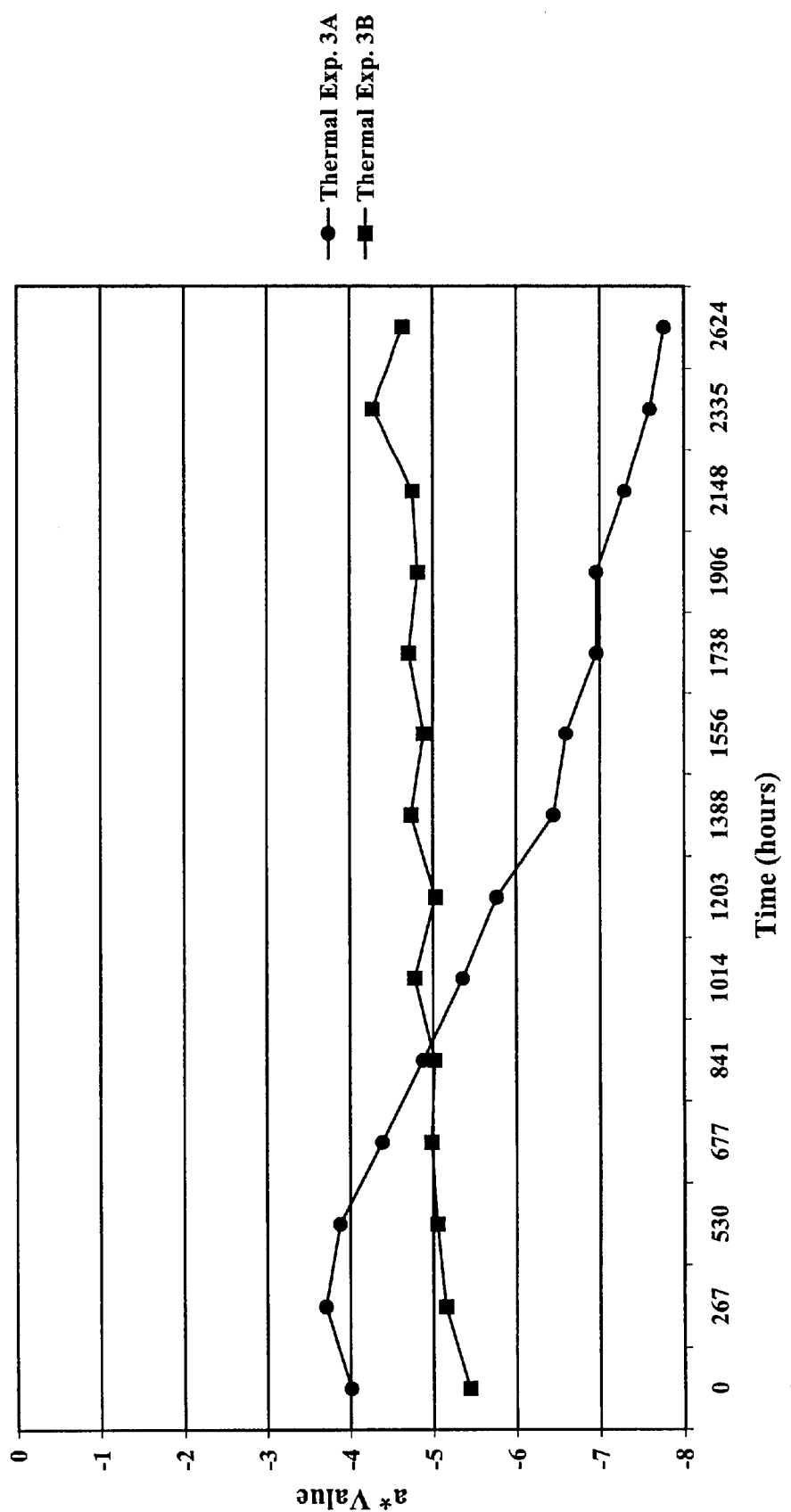
FIG. 6 of the drawings is a two-dimensional plot showing the change in a* value as a function of exposure time to elevated temperatures for Experiments 3A–3B.
Figure 7:
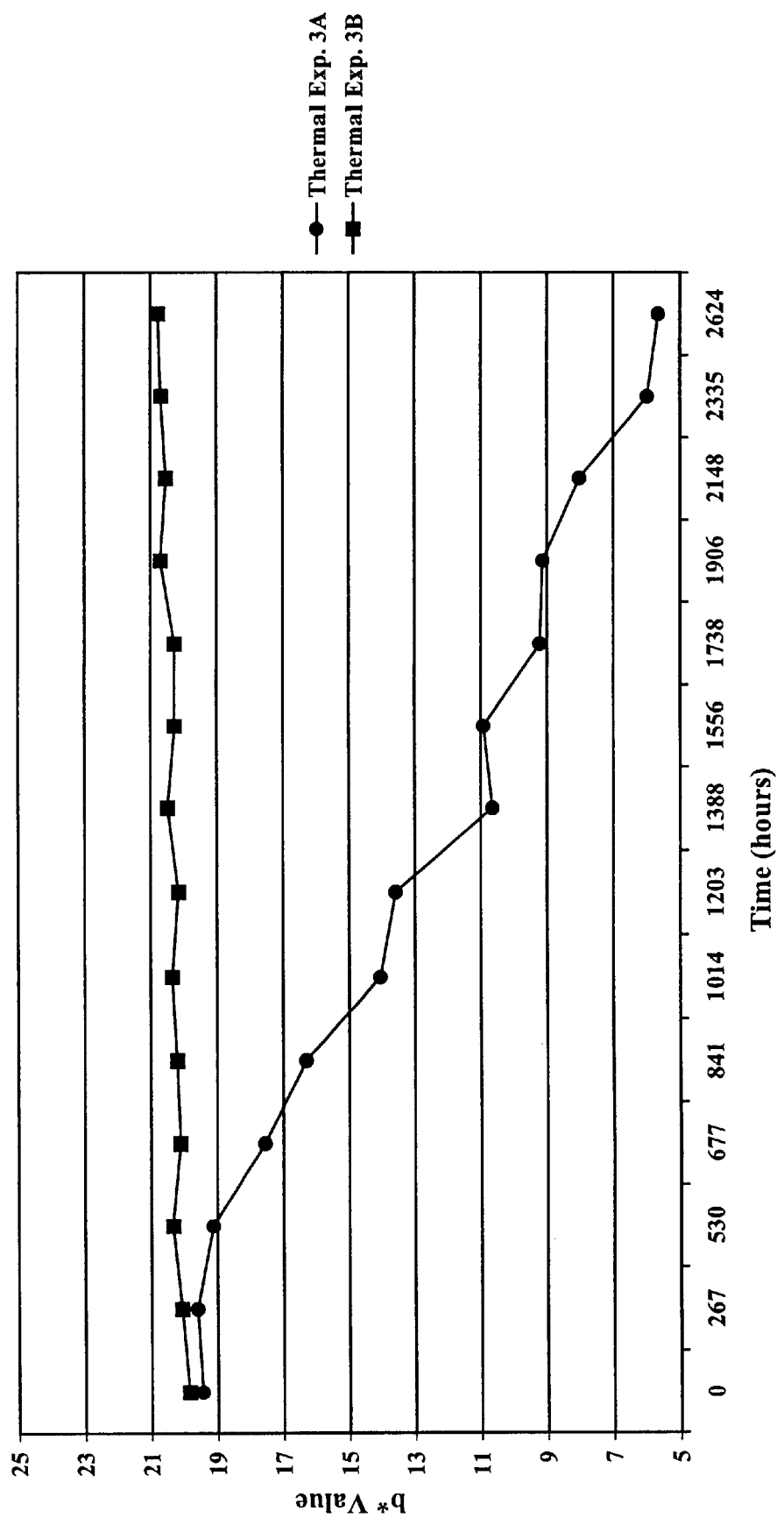
FIG. 7 of the drawings is a two-dimensional plot showing the change in b* value as a function of exposure time to elevated temperatures for Experiments 3A–3B.

As is shown in both FIGS. 6 and 7, the medium with the ferrocinium complex (Exp.3B) is substantially more thermally stable than the analogous medium without the additive (Exp. 3A). In fact, the medium without the additive fails "blue" almost immediately (as indicated by the decreasing b* values).

Experiment No. 4

In this experiment two electrochromic media were prepared by mixing the following materials together in the concentrations provided below. Experiment 4A is void of an additive.

Experiment No. 4A

| Component | Material | Concentration |
|---|---|---|
| Cathodic | Methylviologen BF$_4$ | 16.0 mM |
| Anodic | Di-tert-butyl-diethylferrocene | 16.0 mM |
| Additive | None | — |
| UV-Stabilizer | Tinuvin 384 | 90.0 mM |
| Thickener | PMMA | 3% by wt |

Experiment No. 4B

| Component | Material | Concentration |
|---|---|---|
| Cathodic | Methylviologen BF$_4$ | 16.0 mM |
| Anodic | Di-tert-butyl-diethylferrocene | 16.0 mM |
| Additive | Di-tert-butyl-diethylferrocinium BF$_4$ | 2.0 mM |
| UV-Stabilizer | Tinuvin 384 | 90.0 mM |
| Thickener | PMMA | 3% by wt |

The above-prepared media were associated with electrochromic windows constructed and tested analogous to those used in Experiment No. 3, and La*b* data was collected at predetermined intervals, which is provided below.

Experiment No. 4-Thermal

| Experiment No. 4A | | | | Experiment No. 4B | | | |
|---|---|---|---|---|---|---|---|
| Hours | L | a* | b* | Hours | L | a* | b* |
| 0 | 81.81 | −5.43 | 16.55 | 0 | 79.76 | −6.60 | 17.34 |
| 270 | 77.86 | −7.61 | 10.32 | 270 | 79.59 | −6.13 | 17.37 |
| 487 | 77.43 | −8.84 | 7.99 | 487 | 81.44 | −6.07 | 18.34 |
| 753 | 75.61 | −8.77 | 6.64 | 753 | 80.18 | −5.78 | 17.35 |
| 921 | 74.29 | −8.76 | 5.49 | 921 | 79.50 | −5.55 | 17.23 |
| 1185 | 72.43 | −9.49 | 2.84 | 1185 | 79.53 | −5.53 | 17.36 |
| 1448 | 71.85 | −9.73 | 2.08 | 1448 | 79.62 | −5.48 | 17.49 |
| 1595 | 71.07 | −9.92 | 1.17 | 1595 | 79.63 | −5.43 | 17.52 |
| 1759 | 70.90 | −9.95 | 0.97 | 1759 | 79.60 | −5.46 | 17.41 |
| 1932 | 69.82 | −10.45 | −0.52 | 1932 | 79.75 | −5.40 | 17.64 |
| 2121 | 70.74 | −9.82 | 0.78 | 2121 | 79.49 | −5.44 | 17.24 |
| 2306 | 69.51 | −10.26 | −0.77 | 2306 | 79.51 | −5.32 | 17.60 |
| 2484 | 69.38 | −10.31 | −1.13 | 2484 | 79.56 | −5.40 | 17.43 |
| 2666 | 68.65 | −10.58 | −2.11 | 2666 | 79.75 | −5.32 | 17.55 |
| 2834 | 68.47 | −10.51 | −2.24 | 2834 | 79.55 | −5.36 | 17.47 |
| 3076 | 68.34 | −10.43 | −2.36 | 3076 | 79.33 | −5.30 | 17.46 |
| 3263 | 68.23 | −10.61 | −2.30 | 3263 | 79.54 | −5.10 | 17.90 |
| 3552 | 67.66 | −10.33 | −3.00 | 3552 | 79.22 | −5.16 | 17.52 |
| 3775 | 66.81 | −10.70 | −4.43 | 3775 | 79.46 | −5.09 | 17.50 |

Figure 8:
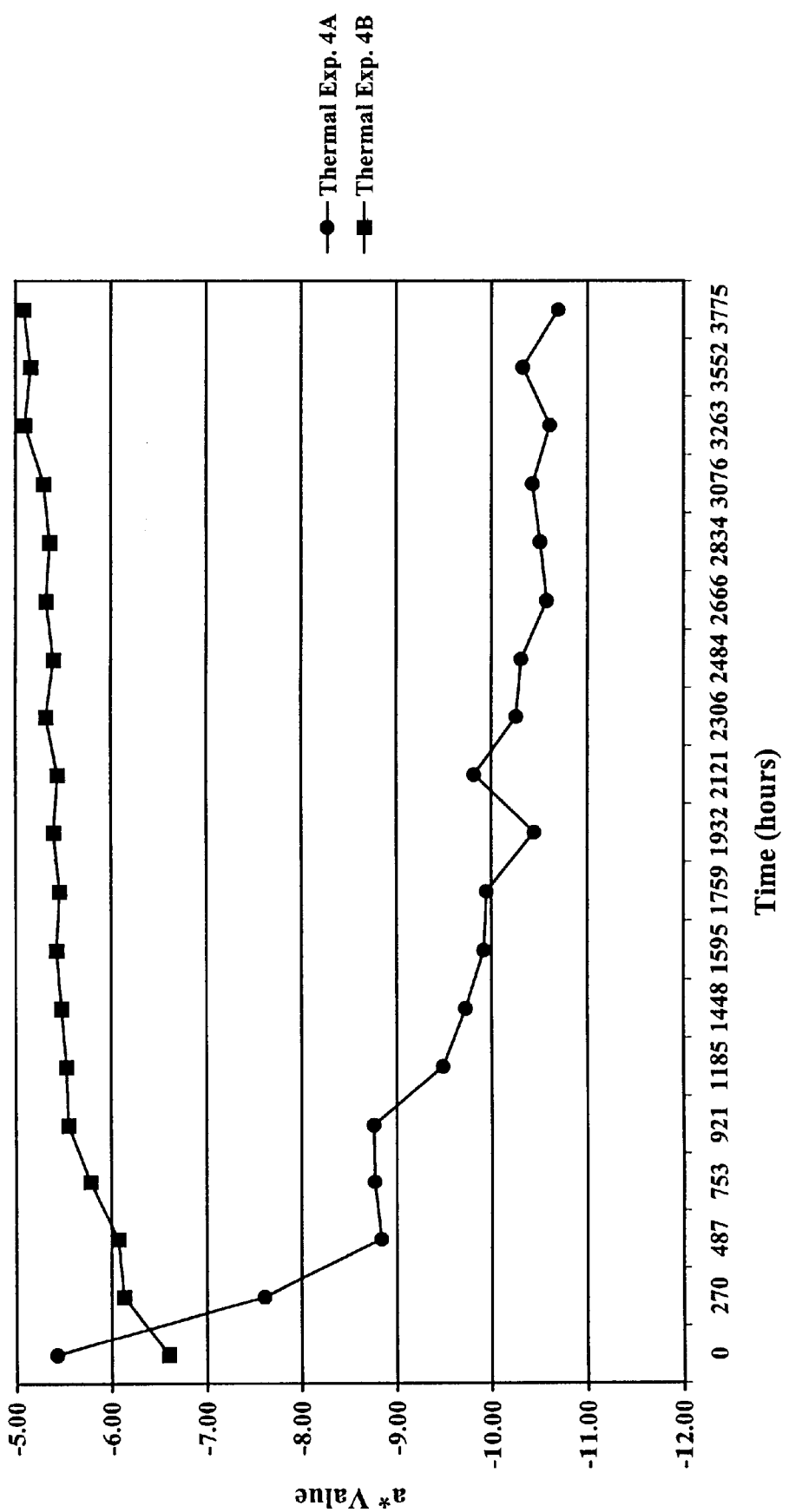
FIG. 8 of the drawings is a two-dimensional plot showing the change in a* value as a function of exposure time to elevated temperatures for Experiments 4A–4B.
Figure 9:
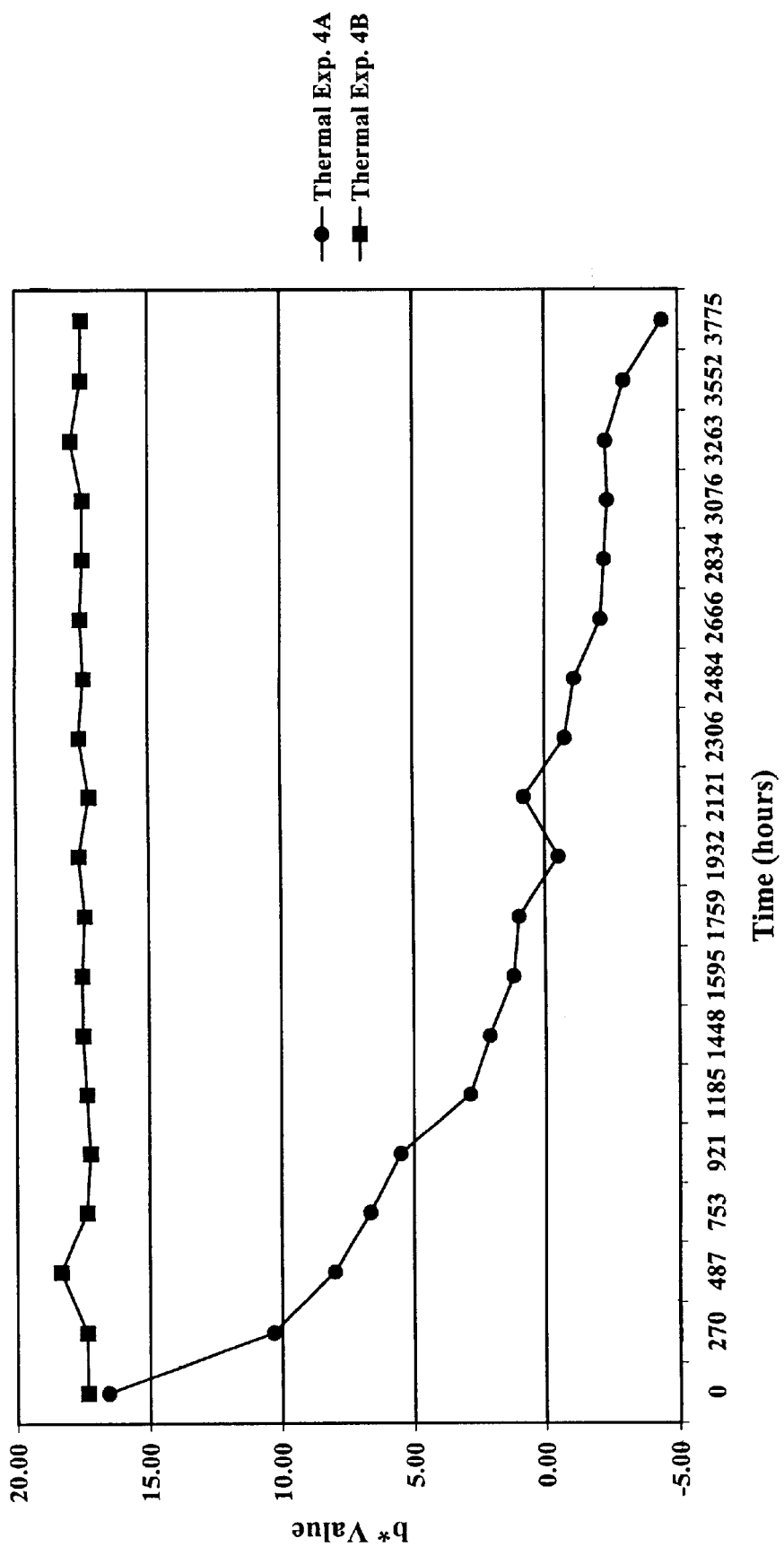
FIG. 9 of the drawings is a two-dimensional plot showing the change in b* value as a function of exposure time to elevated temperatures for Experiments 4A–4B.

FIGS. 8 and 9 graphically demonstrate that, once again, the medium without the additive (Exp. 4A) begins to fail rapidly relative to the medium comprising the additive.

As can be seen from the above-provided experiments, the incorporation of one or more of the disclosed additives substantially improves the color-stability of an electrochromic medium—even under oxidative environments or elevated temperatures.

While the invention has been described in detail herein in accordance with certain preferred embodiments thereof, many modifications and changes therein may be effected by those skilled in the art. Accordingly, it is our intent to be limited only by the scope of the appending claims and not by way of details and instrumentalities describing the embodiments shown herein.

What is claimed is:

1. An electrochromic medium for use in a normally operating electrochromic device, comprising:

an anodic material and a cathodic material, wherein both of the anodic and cathodic materials are electroactive and at least one of the anodic and cathodic materials is electrochromic; and an additive, wherein the additive is more easily reduced than the cathodic material, and wherein the additive substantially precludes the formation of a residual reduced cathodic material while the electrochromic medium is in a high transmission state.

2. The electrochromic medium according to claim 1, wherein the additive comprises an oxidized form of the anodic material.

3. The electrochromic medium according to claim 1, wherein the additive comprises an additional material present in an oxidized form.

4. The electrochromic medium according to claim 1, wherein the additive is selected from the group comprising ferrocinium salts, substituted ferrocinium salts, phenazinium salts, substituted phenazinium salts, and mixtures thereof.

5. The electrochromic medium according to claim 4, wherein the additive is selected from the group comprising di-tert-butyl-diethylferrocinium tetrafluoroborate, (6-(tetra-tert-butylferrocinium)hexyl)triethylammonium di-tetrafluoroborate, (3-(tetra-tert-butylferrocinium)propyl)

triethylammonium di-tetrafluoroborate, 5-methyl-phenazinium tetrafluoroborate, and mixtures thereof.

6. The electrochromic medium according to claim 5, wherein the concentration of the additive ranges from approximately 0.01 mM to approximately 10 mM.

7. The electrochromic medium according to claim 1, wherein the cathodic material comprises a viologen.

8. The electrochromic medium according to claim 7, wherein the concentration of the cathodic material ranges from approximately 1 mM to approximately 500 mM.

9. The electrochromic medium according to claim 8, wherein the concentration of the cathodic material ranges from approximately 5 mM to approximately 50 mM.

10. The electrochromic medium according to claim 1, wherein the cathodic material comprises tungsten oxide.

11. The electrochromic medium according to claim 1, wherein the anodic material is selected from the group comprising ferrocene, substituted ferrocenes, substituted ferrocenyl salts, phenazine, substituted phenazines, phenothiazine, substituted phenothiazines, and mixtures thereof.

12. The electrochromic medium according to claim 11, wherein the anodic material is selected from the group comprising di-tert-butyl-diethylferrocene, (6-(tetra-tert-butylferrocenyl)hexyl)triethylammonium tetrafluoroborate, (3-(tetra-tert-butylferrocenyl)-propyl)triethylammonium tetrafluoroborate, 5,10-dimethylphenazine, 3,7,10-trimethylphenothiazine, and mixtures thereof.

13. The electrochromic medium according to claim 12, wherein the concentration of the anodic material ranges from approximately 1 mM to approximately 500 mM.

14. The electrochromic medium according to claim 13, wherein the concentration of the anodic material ranges from approximately 5 mM to approximately 50 mM.

15. An electrochromic medium for use in a normally operating electrochromic device, comprising:
   an anodic material and a cathodic material, wherein both of the anodic and cathodic materials are electroactive and at least one of the anodic and cathodic materials is electrochromic; and
   an additive, wherein the additive comprises a reduced form of the cathodic material.

16. The electrochromic medium according to claim 15, wherein the additive substantially precludes the formation of a residual oxidized anodic material while the electrochromic medium is in a high transmission state.

17. An electrochromic medium for use in a normally operating electrochromic device, comprising:
   an anodic material and a cathodic material, wherein both of the anodic and cathodic materials are electroactive and at least one of the anodic and cathodic materials is electrochromic; and
   an additive, wherein the additive is more easily oxidized than the anodic material and wherein the additive substantially precludes the formation of a residual oxidized anodic material while the electrochromic medium is in a high transmission state, said additive being selected from the group comprising substituted ferrocenes, substituted ferrocenyl salts, and mixtures thereof.

18. The electrochromic medium according to claim 17, wherein the additive is selected from the group comprising (6-(tetra-tert-butylferrocenyl)hexyl) triethylammonium tetrafluoroborate, (3-(tetra-tert-butylferrocenyl)propyl) tri-ethylammonium tetrafluoroborate, di-tert-butyl-diethylferrocene and mixtures thereof.

19. The electrochromic medium according to claim 18, wherein the concentration of the additive ranges from approximately 0.01 mM to approximately 10 mM.

20. The electrochromic medium according to claim 17, wherein the cathodic material comprises a viologen.

21. The electrochromic medium according to claim 20, wherein the concentration of the cathodic material ranges from approximately 1 mM to approximately 500 mM.

22. The electrochromic medium according to claim 21, wherein the concentration of the cathodic material ranges from approximately 5 mM to approximately 50 mM.

23. The electrochromic medium according to claim 17, wherein the cathodic material comprises tungsten oxide.

24. The electrochromic medium aording to claim 17, wherein the anodic material is selected from the group comprising ferrocene, substituted ferrocenes, substituted ferrocenyl salts, phenazine, substituted phenazines, phenothiazine, substituted phenothiazines, and mixtures thereof.

25. The electrochromic medium according to claim 24, wherein the anodic material is selected from the group comprising di-tert-butyl-diethylferrocene, (6-(tetra-tert-butylferrocenyl)hexyl)triethylammonium tetrafluoroborate, (3-(tetra-tert-butylferrocenyl)-propyl)triethylammonium tetrafluoroborate, 5,10-dimethylphenazine, 3,7,10-trimethylphenothiazine, and mixtures thereof.

26. The electrochromic medium according to claim 25, wherein the concentration of the anodic material ranges from approximately 1 mM to approximately 500 mM.

27. The electrochromic medium according to claim 26, wherein the concentration of the anodic material ranges from approximately 5 mM to approximately 50 mM.

28. An electrochromic medium for use in a normally operating electrochromic device, comprising:
   an anodic material and a cathodic material, wherein both of the anodic and cathodic materials are electroactive and at least one of the anodic and cathodic materials is electrochromic; and
   an additive, wherein the additive comprises:
      a first component that is more easily reduced than the cathodic material; and
      a second component that is more easily oxidized than the anodic material.

29. The electrochromic medium according to claim 28, wherein the first component substantially precludes the formation of a residual reduced cathodic material and the second component substantially precludes the formation of a residual oxidized anodic material while the electrochromic medium is in a high transmission state.

30. The electrochromic medium according to claim 28, wherein the first component comprises an oxidized form of the anodic material.

31. The electrochromic medium according to claim 28, wherein the first component comprises an additional electroactive material present in an oxidized form.

32. The electrochromic medium according to claim 28, wherein the first component is selected from the group comprising ferrocinium salts, substituted ferrocinium salts, phenazinium salts, substituted phenazinium salts, and mixtures thereof.

33. The electrochromic medium according to claim 32, wherein the additive is selected from the group comprising di-tert-butyl-diethylferrocinium tetrafluoroborate, (6-(tetra-tert-butylferrocinium)hexyl)triethylammonium di-tetrafluoroborate, (3-(tetra-tert-butylferrocinium)propyl) triethyl ammonium di-tetrafluoroborate, 5-methylphenazinium tetrafluoroborate, and mixtures thereof.

34. The electrochromic medium according to claim 33, wherein the concentration of the first component ranges from approximately 0.01 mM to approximately 10 mM.

35. The electrochromic medium according to claim 28, wherein the second component is selected from the group comprising substituted phenazines, substituted ferrocenes, substituted ferrocenyl salts, and mixtures thereof.

36. The electrochromic medium according to claim 35, wherein the second component is selected from the group comprising 5-methylphenazine, (6-(tetra-tert-butylferrocenyl)hexyl)triethylammonium tetrafluoroborate, (3-(tetra-tert-butylferrocenyl)propyl)triethylammonium tetrafluoroborate, di-tert-butyl-diethylferrocene and mixtures thereof.

37. The electrochromic medium according to claim 36, wherein the concentration of the second component ranges from approximately 0.01 mM to approximately 10 mM.

38. The electrochromic medium according to claim 28, wherein the cathodic material comprises a viologen.

39. The electrochromic medium according to claim 38, wherein the concentration of the cathodic material ranges from approximately 1 mM to approximately 500 mM.

40. The electrochromic medium according to claim 39, wherein the concentration of the cathodic material ranges from approximately 5 mM to approximately 50 mM.

41. The electrochromic medium according to claim 28, wherein the cathodic material comprises tungsten oxide.

42. The electrochromic medium according to claim 28, wherein the anodic material is selected from the group comprising ferrocene, substituted ferrocenes, substituted ferrocenyl salts, phenazine, substituted phenazines, phenothiazine, substituted phenothiazines, and mixtures thereof.

43. The electrochromic medium according to claim 42, wherein the anodic material is selected from the group comprising di-tert-butyl-diethylferrocene, (6-(tetra-tert-butylferrocenyl)hexyl)triethylammonium tetrafluoroborate, (3-(tetra-tert-butylferrocenyl)-propyl)triethylammonium tetrafluoroborate, 5,10-dimethylphenazine, 3,7,10-trimethylphenothiazine, and mixtures thereof.

44. The electrochromic medium according to claim 43, wherein the concentration of the anodic material ranges from approximately 1 mM to approximately 500 mM.

45. The electrochromic medium according to claim 44, wherein the concentration of the anodic material ranges from approximately 5 mM to approximately 50 mM.

46. An electrochromic medium for use in a normally operating electrochromic device, comprising:
an anodic material and a cathodic material, wherein both of the anodic and cathodic materials are electroactive and at least one of the anodic and cathodic materials is electrochromic;
an additive; and
means associated with the additive for maintaining a nearly colorless electrochromic medium while the electrochromic medium is in a high transmission state relative to an electrochromic medium without the additive.

47. The electrochromic medium according to claim 46, wherein the nearly colorless electrochromic medium maintaining means comprises the additive being more easily reduced than the cathodic material.

48. The electrochromic medium according to claim 46, wherein the nearly colorless electrochromic medium maintaining means comprises the additive being a reduced form of the cathodic material.

49. The electrochromic medium according to claim 46, wherein the nearly colorless electrochromic medium maintaining means comprises the additive being more easily oxidized than the anodic material, said additive being selected from the group comprising substituted ferrocenes, substituted ferrocenyl salts, and mixtures thereof.

50. The electrochromic medium according to claim 46, wherein the nearly colorless electrochromic medium maintaining means comprises the additive having a first component and a second component wherein,
the first component is more easily reduced than the cathodic material; and
the second component is more easily oxidized than the anodic material.

51. An electrochromic device comprising:
at least one substantially transparent substrate; and
an electrochromic medium according to claims 1, 15, 17, 28, or 46 associated with the at least one substantially transparent substrate.

52. The electrochromic device according to claim 51, comprising a first substantially transparent substrate and a second substrate.

53. The electrochromic device according to claim 52, wherein the device is an electrochromic window.

54. The electrochromic device according to claim 52, wherein the second substrate is plated with a reflective material.

55. The electrochromic device according to claim 54, wherein the reflective material is selected from the group comprising chromium, rhodium, silver, alloys of the same, and mixtures thereof.

56. The electrochromic device according to claim 55, wherein the device is a vehicular electrochromic mirror.

57. An electrochromic process comprising the steps of:
providing an electrochromic medium which comprises an anodic material and a cathodic material, wherein both of the anodic and cathodic materials are electroactive and at least one of the anodic and cathodic materials is electrochromic and an additive;
cycling the electrochromic medium between a high transmission state and a low transmission state; and
maintaining a nearly colorless electrochromic medium during said high transmission state relative to an electrochromic medium without the additive.

* * * * *